Figure 1:
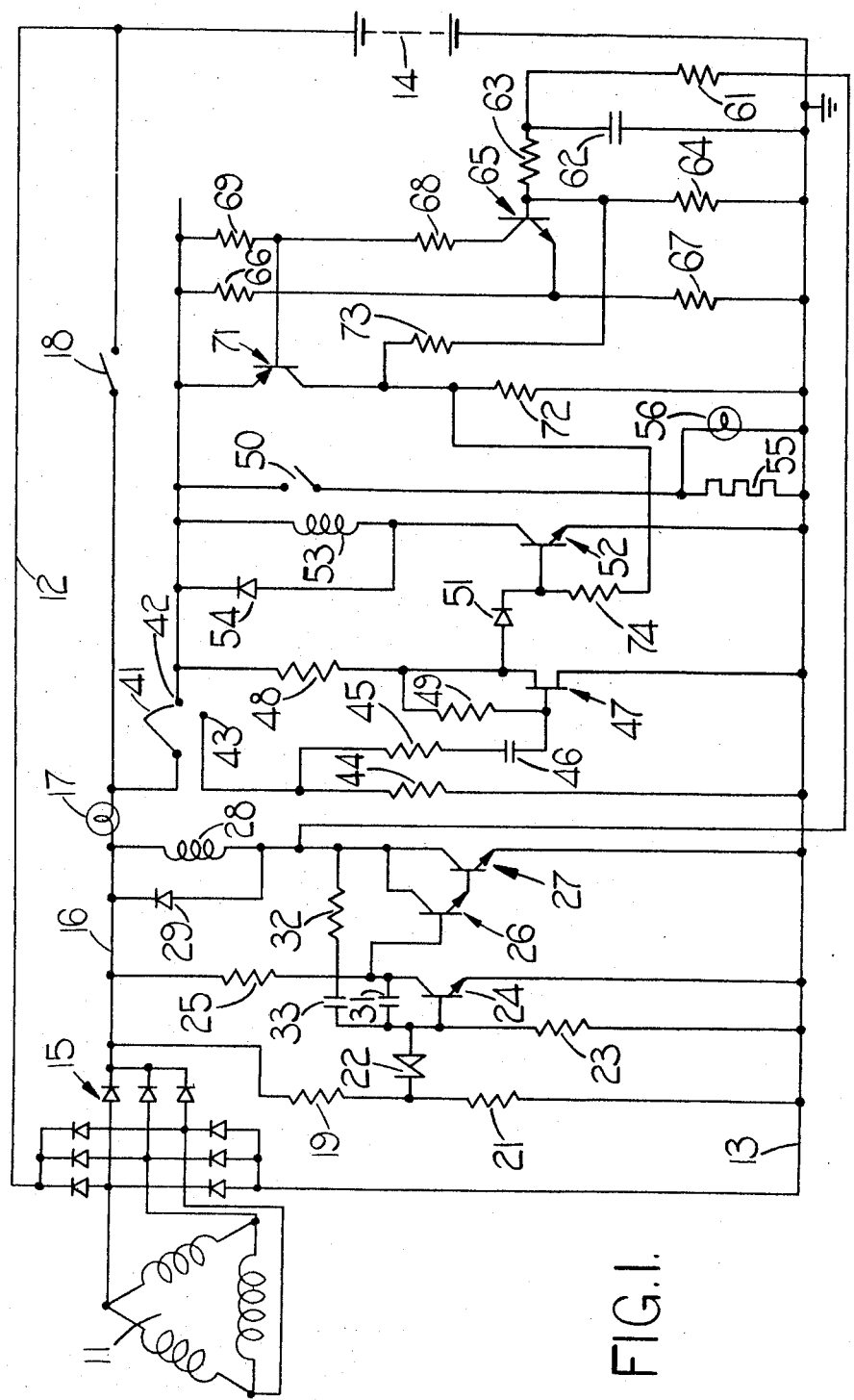

United States Patent [19]
Hill et al.

[11] 3,868,559
[45] Feb. 25, 1975

[54] BATTERY CHARGING SYSTEMS

[75] Inventors: William Frank Hill, Stafford; Albert William Winkley, Hadley, both of England

[73] Assignee: The Lucas Electrical Company, Limited, Birmingham, England

[22] Filed: Oct. 25, 1973

[21] Appl. No.: 409,448

[30] Foreign Application Priority Data
Nov. 21, 1972  Great Britain .................... 53840/72
Dec. 19, 1972  Great Britain .................... 58676/72

[52] U.S. Cl. ................. 320/61, 219/202, 307/10 R, 322/8
[51] Int. Cl. ........................ B62d 63/04, H02j 7/14
[58] Field of Search ........... 320/40, 61, 39; 317/31, 317/33, 9 BP; 322/7, 8; 307/10, 10 BP; 219/203, 202, 477, 488

[56] References Cited
UNITED STATES PATENTS

| | | |
|---|---|---|
| 2,654,826 | 10/1953 | Spurlin .......................... 219/203 UX |
| 3,474,296 | 10/1969 | Rickey ............................. 320/40 X |
| 3,522,481 | 8/1970 | Terzic ................................... 317/31 |
| 3,524,044 | 8/1970 | Liardi ................................ 219/203 |
| 3,723,752 | 3/1973 | Russell ........................... 307/10 BP |
| 3,752,348 | 8/1973 | Dickason et al. ................... 219/203 |

Primary Examiner—J. D. Miller
Assistant Examiner—Robert J. Hickey
Attorney, Agent, or Firm—Holman & Stern

[57] ABSTRACT

In a battery charging system, the output voltage of the generator is sensed, and if it becomes too low then a non-essential load is disconnected. Preferably, discharge of the battery is anticipated by sensing when the generator is approaching its maximum output.

9 Claims, 2 Drawing Figures

BATTERY CHARGING SYSTEMS

This invention relates to battery charging systems, more particularly for use in road vehicles.

The invention resides in a battery charging system including a generator charging a battery under the control of a voltage regulator, at least one non-essential load connected across the battery, and means sensitive to the output voltage of the generator for disconnecting said non-essential load when the output voltage of the generator falls below a predetermined value.

In one arrangement, the predetermined value is that at which the generator is producing its maximum output, so that the load is disconnected at the moment when the battery starts to discharge. Preferably, however, the load is disconnected when the generator is approaching its maximum output, so that battery discharge is anticipated.

In the preferred arrangement, the load is reconnected when the output voltage of the generator rises to a second and higher predetermined level.

The predetermined output voltage of the generator can be measured by comparing the generator output voltage with a fixed reference. Preferably, however, the generator is a wound-field machine and the voltage regulator feeds the field winding of the machine with voltage at a mark-space ratio dependent upon the output voltage of the generator, the generator output voltage being measured indirectly by sensing the mark-space ratio. Where the load is to be disconnected only when the battery is about to discharge, then the disconnection takes place when the mark-space ratio is infinite. However, where the load is to be disconnected before the battery starts to discharge, then the load is disconnected when the mark-space ratio reaches a high value which is less than infinity.

The non-essential load can be any load which does not prevent the system from operating when it is disconnected. In the preferred arrangement for use in a road vehicle the non-essential load is a rear window demister.

Preferably, means is provided for enabling the non-essential load to be energised for a predetermined period of time irrespective of the output voltage of the generator.

In another aspect, the invention resides in a road vehicle battery charging system including a battery, a generator charging the battery under the control of a voltage regulator, a non-essential load connected across the battery in series with a manually operable switch controlling the load, and a voltage-sensitive switching means connected across the battery and serving to break the circuit to said load when the battery voltage falls to a value lower than the voltage set by the regulator, but higher than the voltage to which the battery falls when the load on the battery exceeds the generator output.

Preferably, means is provided for energising the load continuously for a predetermined period of time when the manually operable switch controlling the load is first closed. Alternatively, the load can be energised for a period of time only if the switch is operated and a predetermined point on the vehicle is at a temperature below a predetermined value.

In another aspect, the invention resides in a road vehicle battery charging system including a battery, a generator charging the battery under the control of a voltage regulator, and a rear-window demister formed in two parts, one part being under the control of a manually operable switch, and the other part being energised only when the voltage of the battery is above a predetermined value.

Figure 2:
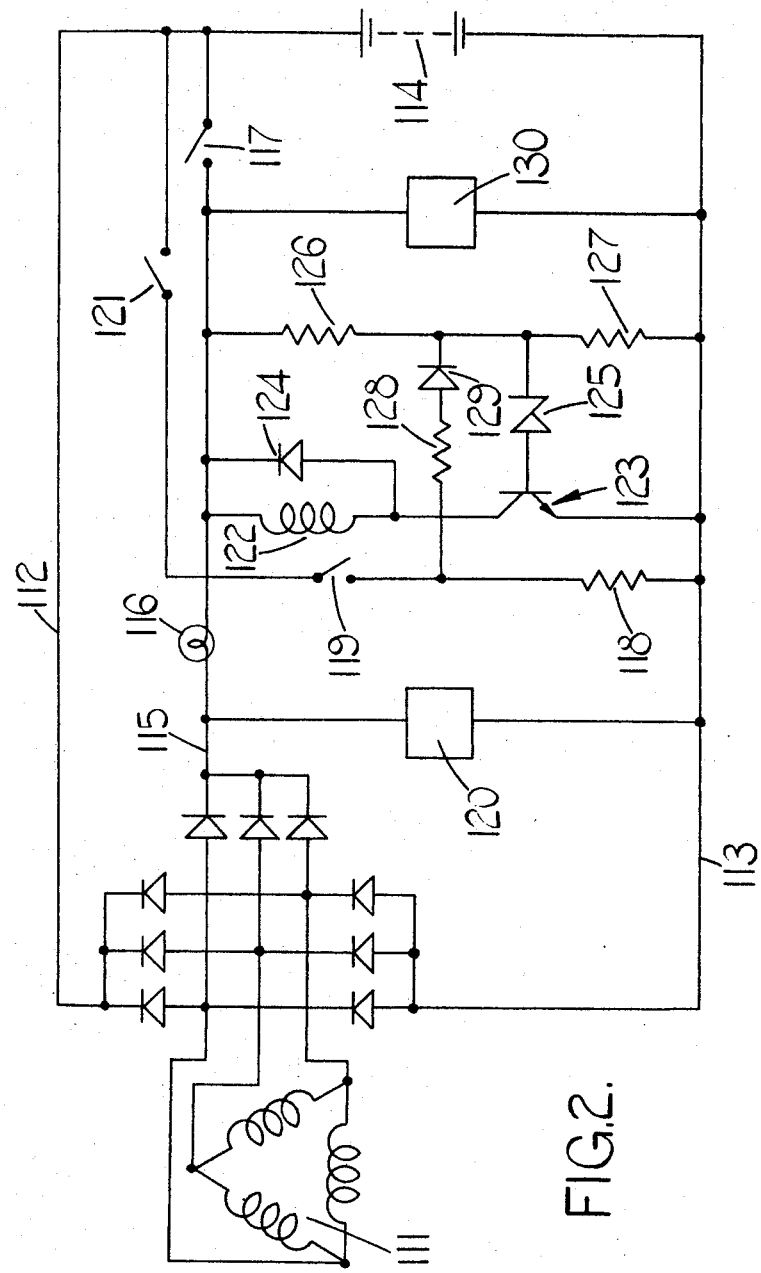

In the accompanying drawings, FIGS. 1 and 2 are circuit diagrams illustrating two examples of the invention.

Referring to FIG. 1, a road vehicle has a wound field alternator 11 which provides power through a full wave rectifier to supply lines 12, 13 between which the vehicle battery 14 is connected. The alternator 11 also supplies power through three additional rectifiers 15, to a supply line 16 which is connected to the line 12 through an ignition warning lamp 17 and the vehicle ignition switch 18 in series.

Connected in series between the lines 16, 13 are a pair of resistors 19, 21 the junction of which is connected to the line 13 through a Zener diode 22 in series with the resistor 23. The junction of the Zener diode 22 and resistor 23 is connected to the base of an n-p-n transistor 23 having its emitter connected to the line 13 and its collector connected through a resistor 25 to the line 16, the collector of the transistor 24 being further connected to the base of an n-p-n transistor 26 the emitter of which is connected to the base of an n-p-n transistor 27 having its emitter connected to the line 13. The collectors of the transistors 26, 27 are connected to the line 16 through the field winding 28 of the alternator 11, the winding 28 being bridged by a freewheel diode 29. The collector and base of the transistor 24 are bridged by a capacitor 31, and the collectors of the transistors 26 and 27 are connected to the base of the transistor 24 through a resistor 32 in series with a capacitor 33.

The junction of the lamp 17 and switch 18 is connected to the movable contact of a switch 41 for controlling a rear window demister on the road vehicle. The movable contact of the switch 41 has an off position shown, and is movable to a stable on position in which it engages the contact 42, and an unstable on position in which it engages the contact 42 and the contact 43. The movable contact is spring loaded from the unstable on position to the stable on position. The contact 43 is connected to the line 13 through a resistor 44, and is further connected through a resistor 45 and a capacitor 46 in series to the gate of a field effect transistor 47 having its source connected to the line 13 and its drain connected through a resistor 48 to the contact 42. The gate and drain of the transistor 47 are interconnected through a resistor 49, and the drain is connected through a diode 51 to the base of an n-p-n transistor 52 having its emitter connected to the line 13 and its collector connected to the contact 42 through a relay winding 53 bridged by a freewheel diode 54. The winding 53 when energised closes a normally open contact 54 which is connected between the contact 42 and the line 13 in series with the rear window demister 55. The demister 55 is bridged by a warning lamp 56 which is illuminated whenever the demister 55 is energised.

The collector of the transistor 27 is further connected to the line 13 through a resistor 61 and a capacitor 62 in series, the junction of the resistor 61 and capacitor 62 being connected to the line 13 through a pair of resistors 63, 64 in series, and the junction of the resistors 63, 64 being connected to the base of an n-p-n transistor 65 having its emitter connected to the junction of a pair of resistors 66, 67 connected in series between the contact 42 and line 13. The collector of the transistor 65 is connected through a pair of resistors 68, 69 in series to the contact 42, and the junction of the resistors 68, 69 is connected to the base of a p-n-p transistor 71, the emitter of which is connected to the contact 42 and the collector of which is connected through a resistor 72 to the line 13. The collector of the transistor 71 is connected through a resistor 73 to the base of the transistor 65, and through a resistor 64 to the base of the transistor 52.

When the ignition switch 18 is closed, current flows through the warning lamp 17, the resistor 25 and the base-emitter paths of the transistor 26 and 27 to illuminate the lamp 17 and energise the winding 28. When the alternator produces an output, the potential of the line 16 becomes equal to that of the line 12 and the lamp 17 is extinguished. As soon as the output voltage of the alternator exceeds a predetermined value the Zener diode 22 conducts, and then turns on the transistor 24, which removes base current from the transistors 26 and 27. The voltage regulator constituted by the transistors 24, 26, 27 and their associated components oscillates by virtue of the feedback connection through the resistor 32 and capacitor 33 between one state with the transistors 24 on and the transistors 26, 27 off, and another state with the transistor 24 off and the transistors 26, 27 on. The mark-space ratio is determined by the output voltage of alternator 11, and will be low, corresponding to low mean field current, when the output voltage of the generator is high, rising to infinity, representing permanent conduction of the transistor 27, when the output voltage of the alternator 11 is lower than the voltage of the battery 14. It will be appreciated that an infinite mark-space ratio represents a situation in which the alternator 11 is not capable of meeting the requirements of the system, so that there is a net discharge of the battery 14.

Considering now the operation of the rear window demister 55, assuming for the moment that it is desired to operate the demister 55 and that the movable contact of the switch 41 is in engagement with the contact 42. The current flow through the switch 41 and the resistors 48, 49 serves to turn on the transistor 47, and so the transistor 52 is off. However, assume for the moment that the total load on the system is such that it is capable of being handled by the alternator 11, so that the alternator 11 has a relatively high output voltage. This high output voltage corresponds to a relatively low mark-space ratio of the transistor 27, and this mark-space ratio is sensed by the capacitor 62, which develops a potential determined by the average potential at the collector of the transistor 27. This potential will be an inverse function of the mark-space ratio, and will in fact vary between the potential of the line 16 when the transistor is off, that is to say zero mark-space ratio, and approximately the potential of the line 13 when the transistor 27 is fully conductive, that is to say infinite mark-space ratio. Provided that the mark-space ratio is below a predetermined level, then the potential across the capacitor 62 is above the level needed to turn on the transistor 65, which in turn turns on the transistor 71, the feedback through the resistor 73 then ensuring that the bistable circuit constituted by the transistors 71 and 65 is in its stable state with the transistors 65 and 71 both on. In these circumstances, the transistor 71 provides current by way of the resistor 74 to turn on the transistor 52, so that the winding 53 is energised, the contact 54 is closed and the demister 55 is energised. The lamp 56 is of course illuminated.

If the load on the alternator increases, the mark-space ratio of the transistor 27 increases, and the potential across the capacitor 62 decreases. When the mark-space ratio reaches a predetermined high level, which could be infinity but is preferably less than infinity, then the transistor 65 switches off, so turning off the transistors 71 and 52, so that the relay winding 53 is no longer energised and the demister 55 is disconnected from the circuit. The generator output voltage must now rise again before the transistor 65 turns on to allow the relay winding 53 to be energised again. The voltage at the collector of the transistor 27 required to turn on the transistor 65 is higher than the voltage required to turn off the transistor 65, by virtue of the differential of the bistable circuits 65, 71. The design is such that when the demister 55 is permitted to be connected in the circuit, the increased load does not cause the mark-space ratio to become infinite. In other words, the demister 55 can only be connected in the system when it is known that the alternator can provide sufficient output to cater for the requirements of the demister 55.

The above description ignores the contact 43. If at any time it is desired to operate the demister 55 for a predetermined period of time independently of the output voltage of the alternator 11, particularly when the demister is first switched on, then the movable contact of the switch 41 is moved into engagement with the contact 43. The capacitor 46 charges rapidly to supply voltage through the gate and source of the transistor 47, but when the movable contact of the switch 41 is released, and re-engages the contact 42, then the capacitor 46 is connected by way of the resistor 44 to the line 13 so that its lower plate assumes a potential substantially more negative than the line 13. The capacitor 46 now discharges and holds the transistor 47 off and consequently the transistor 52 on, independently of current flowing through the resistor 74. As the capacitor 46 discharges, the transistor 47 gradually turns on more, until a point is reached at which the transistor 52 is no longer held on, and the demister 55 is disconnected from the circuit unless the output voltage of the alternator is above the predetermined value at which the transistor 65 and 71 are on.

Referring now to FIG. 2, a road vehicle incorporates an alternator 111 which provides power by way of a full wave rectifier to positive and negative supply lines 112, 113 between which the battery 114 of the vehicle is connected. The alternator also provides power through three additional diodes to a positive supply line 115 which is connected to the positive battery terminal through a warning lamp 116 and the vehicle ignition switch 117 in series. The line 115 is connected to the line 113 through the voltage regulator 120 of the vehicle, the regulator 120 acting to control the current flowing in the field winding (not shown) of the alternator 111.

The vehicle incorporates a rear window demister 118 one end of which is connected to the line 113 and the other end of which is connected to the positive battery terminal through a relay contact 119 and a manually operable switch 121 in series. The normally open relay contact 119 is operated by a relay winding 122 one end of which is connected to the positive battery terminal through the ignition switch 117, and the other end of which is connected to the collector of an n-p-n transistor 123 having its emitter connected to the line 113. The winding 122 is bridge by a free-wheel diode 124, and the base of the transistor 123 is connected through a Zener diode 125 to the junction of a pair of resistors 126, 127 connected in series with the ignition switch 117 across the battery 114. Moreover, the junction of the contact 119 and the resistor 118 is connected through a resistor 128 and a diode 129 in series to the junction of the resistors 126, 127. The ignition switch 117 also controls current flowing to other loads indicated at 130.

When the ignition switch 117 is closed, the voltage regulator 120 is first energised through the lamp 116, but when the alternator 111 produces an output, the regulator 118 is energised from the line 115 and the lamp 116 is extinguished.

The voltage regulator is set to charge the battery 114 at a predetermined voltage, which in a 12 volt system is typically 14.2 volts. Whilst the battery voltage is at this level, then the Zener diode 125 conducts, the transistor 123 is on, the winding 122 is energised and the contact 119 is closed. If at any time the switch 121 is closed, the demister 118 is energised. However, if for any reason the load on the battery 114 is in excess of the output of the generator 111, then the battery voltage falls rapidly, typically to a value of less than 12.5 volts, or considerably less if the battery is not in good condition. The resistor 127 is selected so that the Zener diode 125 ceases to conduct at a battery voltage between 14.2 volts and 12.5 volts. When the Zener diode 125 ceases to conduct, the winding 122 is de-energised and the contact 119 opens, so that with the switch 121 closed, the demister 118 is still not operated.

While the relay contact 119 is closed, and the switch 121 is also closed, current can flow through the resistor 128 and diode 129, and thence through the resistor 127. When the contact 119 is open, current ceases to flow in this path, and the resistor 128 sets the differential between the battery voltages at which the contact 119 opens and closes. Typically, the Zener diode conducts at 13.3 volts and turns off at about 12.5 volts.

It will be appreciated that there are various modes of operation of the circuit shown, depending on the load on the battery 114. By way of example, the engine speed may be such that the available output from the alternator is less than the total load on the battery 114, that is to say the load including the demister 118, but greater than the load on the battery excluding the demister 118. In such circumstances, the relay winding 122 will be energised and de-energised to provide a mean current flow to the demister 118. In another mode, the output of the alternator 111 may be less than the load on the battery 114 even without the demister 118. In this case the demister 118 will remain de-energised until the alternator speed increases.

In a modification, the voltage is sensed by a simple electro-mechanical relay, but the arrangement disclosed is preferred, because the differential can be controlled more accurately, and the contact 119 can be made to open and close quickly to minimise arcing.

In a modification (not shown) each time the switch 121 is closed, the demister 118 is energised for a predetermined period of time. This effect can be achieved simply by arranging that the winding 122 is energised for a predetermined period of time, independently of the transistor 123, whenever the switch 121 is first closed. For example, the switch 121 can be arranged to charge a capacitor, and a further transistor can short-circuit the collector-emitter of the transistor 123 until the capacitor is charged. In another arrangement, the delay is operative only if the temperature of a part of the body of the vehicle is below a predetermined value.

In another example, the demister 118 is formed in two parts, one part in the most critical area of the rear window, and the other part in a less critical area of the rear window. The critical part is controlled by the switch 121 directly, independently of the condition of the relay contact 119. The other part is controlled by the contact 119.

We claim:

1. A battery charging system including a wound-field generator charging a battery, on a voltage regulator, said voltage regulator having a switching device in series with the field winding, together with means sensitive to the voltage of the battery determining the mark-space ratio of said switching device, at least one non-essential load connected across the battery, and means sensitive to the mark-space ratio of said switching device for dis-connecting said non-essential load when the output voltage of the generator falls below a predetermined value.

2. A system as claimed in claim 1 in which the predetermined value is that at which the generator is producing its maximum output, so that the load is disconnected at the moment when the battery starts to discharge.

3. A system as claimed in claim 1 in which the load is dis-connected when the generator is approaching its maximum output, so that battery discharge is anticipated.

4. A system as claimed in claim 1 in which the load is re-connected when the output voltage of the generator rises to a second and higher predetermined level.

5. A system as claimed in any claim 1 in which the non-essential load is a rear window demister.

6. A system as claimed in claim 1 including means for enabling the non-essential load to be energised for a predetermined period of time irrespective of the output voltage of the generator.

7. A system as claimed in claim 1 including a manually operable switch connected in series with said non-essential load across the battery, and timing means operable when said manually operable switch is closed for energising said load continuously for a predetermined period of time irrespective of the output voltage of the generator.

8. A system as claimed in claim 7 including temperature-sensitive means measuring the temperature at a predetermined point of the vehicle, and inhibiting means operable if said temperature is below a predetermined value for preventing energisation of the load continuously for said predetermined period of time.

9. A road vehicle battery charging system including a battery, a generator charging the battery under the control of a voltage regulator, and a rear-window demister formed in two parts, a manually operable switch controlling energisation of one part of said demister, and means for detecting when the voltage of the battery is above a predetermined value, and then energising the other part of the demister.

* * * * *